(12) United States Patent
Wade

(10) Patent No.: US 8,684,738 B2
(45) Date of Patent: Apr. 1, 2014

(54) METHOD AND TOOL FOR FIREARM SIGHT TRAINING

(75) Inventor: Christian Patrick Wade, Stafford, VA (US)

(73) Assignee: The United States of America, as represented by the Secretary of the Navy, Washingotn, DC (US)

( * ) Notice: Subject to any disclaimer, the term of this patent is extended or adjusted under 35 U.S.C. 154(b) by 52 days.

(21) Appl. No.: 13/293,168

(22) Filed: Nov. 10, 2011

(65) Prior Publication Data

US 2012/0115110 A1    May 10, 2012

Related U.S. Application Data

(60) Provisional application No. 61/412,289, filed on Nov. 10, 2010.

(51) Int. Cl.
*F41G 3/26* (2006.01)

(52) U.S. Cl.
USPC .............................................. 434/19; 434/11

(58) Field of Classification Search
USPC ................... 434/11–27; 42/122; 362/311.06; 396/502
See application file for complete search history.

(56) References Cited

U.S. PATENT DOCUMENTS

2011/0207089 A1 *    8/2011    Lagettie et al. .................. 434/22

OTHER PUBLICATIONS

Shooterready.pdf—retrieved from http://web.archive.org/web/20090712022401/http://www.shooterready.com/mildot.html. Verified online as early as Jul. 12, 2009 via web.archive.org.*

* cited by examiner

*Primary Examiner* — Timothy A Musselman
(74) *Attorney, Agent, or Firm* — Timothy J. Slabouz

(57) ABSTRACT

The present invention is a firearm sight training tool, and, more specifically, relates to a method and tool for training a shooter to properly align a firearm's sights relative to a target, which through its implementation and use may provide for a more efficient and low cost means of training a firearm user to properly align a firearm's sights relative to the firearm user's target of interest.

13 Claims, 6 Drawing Sheets

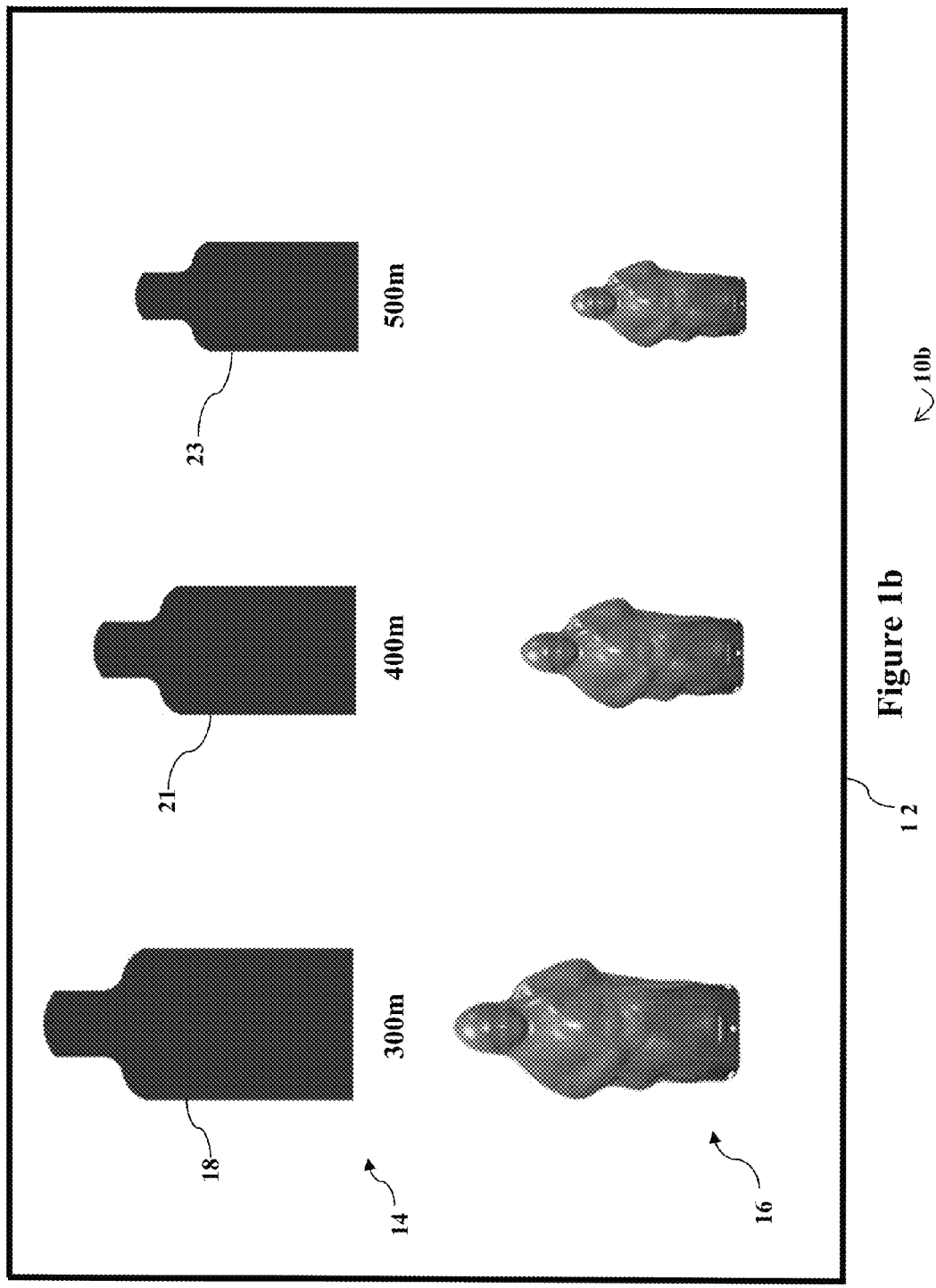

METHOD AND TOOL FOR FIREARM SIGHT TRAINING

CROSS REFERENCE TO RELATED APPLICATIONS

This non provisional Application claims the benefit of prior provisional application No. 61/412,289, filed Nov. 10, 2010, the entire contents of that application and all related submittals are hereby incorporated by reference for all purposes as if fully set forth herein. Applicant claims the priority date benefits of that provisional application.

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

COPYRIGHT NOTICE

A portion of the disclosure of this document may contain materials that are subject to copyright protection. The copyright owner has no objection to the facsimile reproduction by anyone of this document or disclosure as it appears in the Patent and Trademark Office patent file or records, but otherwise reserves all copyright rights whatsoever.

REFERENCE TO A SEQUENCE LISTING, A TABLE, OR A COMPUTER PROGRAM LISTING COMPACT DISK APPENDIX

N/A

BACKGROUND OF THE INVENTION

1. Field of the Invention

The present invention is directed, in general, to a firearm sight training tool, and, more specifically, relates to a method and tool for training a shooter to properly align a firearm's sights relative to a target. The applicable technical fields include those fields associated with training tools and methods for achieving and enhancing shooting accuracy.

2. Description of the Background Art

Every Marine is a rifleman. The following excerpt is a portion of work that every Marine must memorize, and is commonly known as the "Rifleman's Creed": "This is my rifle. There are many like it, but this one is mine. It is my life. I must master it as I must master my life. Without me my rifle is useless. Without my rifle, I am useless. I must fire my rifle true. I must shoot straighter than the enemy who is trying to kill me. I must shoot him before he shoots me. I will. My rifle and I know that what counts in war is not the rounds we fire, the noise of our burst, or the smoke we make. We know that it is the hits that count. We will hit . . . . "

Firearm training is a critical portion of the instruction received by our Marines and other military and law enforcement personnel, and it can be just as important to recreational shooters and private citizens. During typical firearm training sessions, a trainee/student is provided instruction on the features and safe handling of a subject firearm/weapon; how to load, unload and clear the firearm; what is a proper firing position or stance; how to use the firearm's sights (or aim); and how to shoot the firearm.

There are a variety of conditions that should be corrected when aligning the sights of a firearm such as a rifle or handgun. As examples, the distance to a target must be taken into consideration to adjust for bullet drop, and other adjustments may be required to account for cross winds and other ambient conditions. Therefore, it is not uncommon for some shooters to experience difficulty in learning how to properly aim their firearms when using prior art methods of instruction, which frequently leads to increased training costs and other unfavorable results—such as the removal of otherwise highly qualified and capable recruits from the Marine Corps or from other positions that require expertise in firearm use.

Moreover, many firearm users first learn how to aim weapons that utilize iron sighting systems. Iron systems may significantly differ from optical sighting systems; therefore, many firearm coaches and instructors experience difficulty in teaching an iron system trained shooter how to utilize and orient an optical sighting system reticle onto a target. This training difficulty is compounded by the inability of both the instructor and the trainee looking through the same optical sight simultaneously, which prevents the instructor from determining if the shooter is properly aligning the sights of the firearm relative to the target. [A sighting system reticle is, in general, a marking or scale on transparent material (as in a gun sight) that is used for aiming. Without limitation, a typical reticle may be cross hairs, a grid, circles, chevrons, or a dot.]

It is the applicant's belief that there is no training tool or method available that effectively "bridges-the-gap" between current training tools or methods that is capable of providing an instructor some sense of certainty or assurance that an instructor's aiming instructions are being comprehended by a trainee.

SUMMARY OF THE INVENTION

The present invention is a firearm sight training tool, and, more specifically, relates to a method and tool for training a shooter to properly align a firearm's sights relative to a target.

Moreover, the applicant believes that the present invention "bridges the gap" in current firearm instructional methods in that there isn't a device that allows the shooter and coach to fully understand what each of them actually see, or is capable in detecting and correcting problems in aiming though the sighting device. In other words, the instructor/coach can never really be sure what the trainee/shooter is actually seeing and/or, if in the case of a scope, if the trainee/shooter has his/her eye in the correct position to eliminate the effect of scope shadow, which is caused by incorrect eye/optic alignment. Also, instructors/coaches have a difficult time expressing where they want a trainee/shooter to aim, and making matters worse they cannot know if the trainee/shooter completely understands and will apply the exact correction being prescribed. Simply put, without this tool it is very difficult providing instruction on the training range.

When coaching or providing firearm or shooting instruction to trainees, whether for recreational shooters or members of the armed forces, law enforcement agencies, or other firearm users, the firearm sight training tool and method as constructed according to embodiments of the present invention, may allow the trainee to explain what he or she sees when aiming through the conventional sighting system (iron sights and/or optical system). Also, based on a trainee's comments, a coach may be able to quickly understand what the trainee sees, evaluate the trainee's comments, and provide immediate, constructive and realistic feedback to the trainee. Therefore, one feature of the invention is that it could be capable of providing a number of benefits including, without limitation, reduced training time; lower ammunition expenditures; greater trainee understanding of sight alignment and sight picture (visualization); and more effective and accurate shooters.

Another feature of the present invention is the possibility that instructors including, but not limited to, marksmanship instructors may be able to utilize the sight training tool to greatly improve efficiency of training sessions, or training systems, in order to quickly transition trainees from one sighting system or firearm to another.

It is an aspect of the present invention that it may include target and transparent reticle template displays that are correctly sized to appear exactly, or as close as possible, to what a trainee/shooter would see when aiming at a variety of targets (i.e., targets including, but not limited to, training targets and/or targets that are more appropriate for combat field firing training) at commonly encountered ranges (i.e., ranges from the trainee/shooter to the target).

Still another feature of the present invention is that the previously described templates may be adaptable for iron sights, conventional optical sights, red dot holographic reflex sight systems, night vision (digital reticles) for small arms and armored fighting vehicle weapon systems, and for other reticles as well.

Still another feature of the present invention is that the sight training tool and method may include rifle and pistol/handgun sight training systems. Moreover, one embodiment of the tool is portable and would be capable for use by instructors/coaches in a range training environment, while another embodiment is capable of being mounted on a stand and would be suitable for classroom instruction. Moreover, one embodiment of the portable system may be secured for carrying/transporting through the use of a metal binder clip or the like with a hole in each template's upper left-hand corner so that instructors/coaches may be able to quickly and easily use whichever combination of transparent reticle display and opaque target display that fits the training environment or need.

Additional features and advantages of the invention will be set forth in the description which follows and in part will be apparent from the description, and other parts of the disclosure of the presently described embodiments including the drawings, or may be learned from the practice of the invention. Other features and advantages of the invention will be realized and attained by the method and system particularly described in the written description, the drawings, and other portions of this disclosure. It is to be understood that the foregoing general and the following detailed descriptions are exemplary and explanatory and are intended to provide further explanation of the invention as claimed.

BRIEF DESCRIPTION OF THE SEVERAL VIEWS OF THE DRAWING

In order to better understand the invention and to see how the same may be carried out in practice, non-limiting preferred embodiments of the invention will now be described with reference to the accompanying drawings, in which:

FIG. 1b is a face view of a firearm sight training tool constructed in accordance with a preferred embodiment of the present invention.

DETAILED DESCRIPTION OF THE INVENTION

Figure 1A:
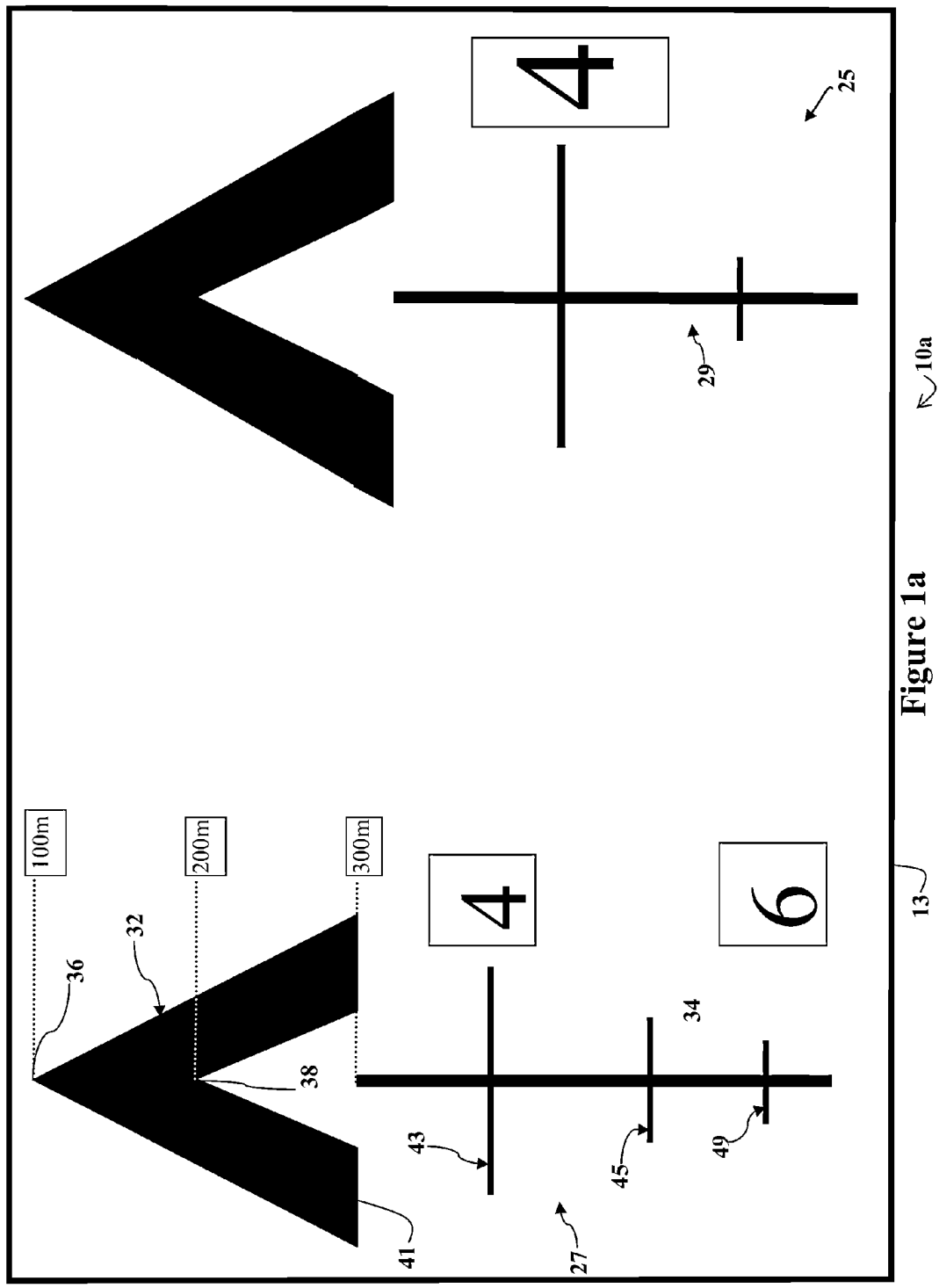
FIG. 1a is a face view of a firearm sight training tool constructed in accordance with a preferred embodiment of the present invention.

Certain embodiments of the present invention will now be described more fully hereinafter with reference to the accompanying drawings, in which some, but not all embodiments of the invention are shown. Indeed, embodiments of the invention may be in many different forms and thus the invention should not be construed as limited to the embodiments set forth herein; rather these embodiments are provided as illustrative examples only. Furthermore, like numbers refer to like elements throughout, and the use of the abbreviation FIG. will be used to identify Figures.

It will be readily understood that the components of the embodiments as generally described and illustrated in the drawings herein, could be arranged and designed in a wide variety of different configurations. Thus, the following more detailed description of the certain described embodiments of the system, components and methods of the present invention, as represented by the drawings, is not intended to limit the scope of the invention, as claimed, but is merely representative of embodiments of the invention.

Referring now to the drawings, and more particularly to FIGS. 1a & 1b, there is shown a non-limiting example of the firearm sight training tool 10a & 10b, which may be construed according to an embodiment of the present invention, and which includes a target display 12 and a reticle display 13. The target display 12 includes a pair of target image sets 14 & 16. The target image set 14 includes a graduated size set of target images 18, 21 and 23. The target image 18 is sized to represent the actual size of the target as viewed through the scope of a firearm at 300 meters ("meters" may be denoted by "m" herein). The next smaller size target image 21 is scaled to a size at a range of 400 meters. The target image 23 is the smallest of the target set 14 and is of a size as seen through a scope at 500 meters.

The reticle display 13 includes a reticle image set 25 comprising a 200 meter reticle image 27 and a 300-500 meter reticle image 29. The two reticle images 27 and 29 are similar except for their size.

Considering the reticle image 27 in greater detail, the reticle image 27 includes a chevron triangular 32 positioned at the top of a vertical post 34. The tip 36 of the chevron 32 indicates an aiming point for a 100 meter range. A crotch portion 38 of the chevron 32 indicates an aiming point for 200 meters. A bottom portion 41 of the chevron 32 is an indicator or aiming point when the target is disposed at 300 meters. A hash mark 43 indicates a 400 meter range; a hash mark 45 indicates a 500 meter range; and a hash mark 49 indicates a 600 meter range.

Figure 2:
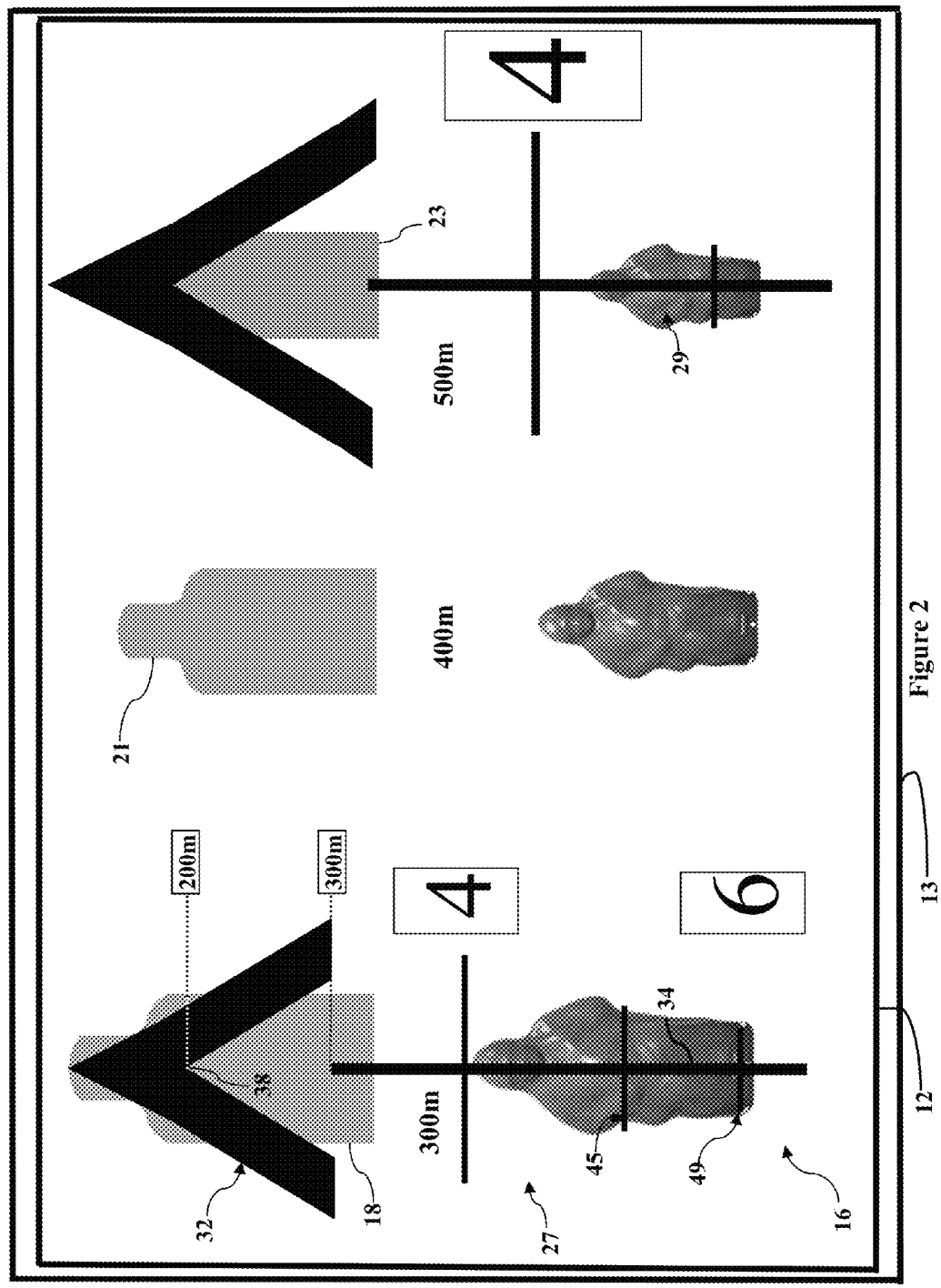
FIG. 2 illustrates a method of using the tool of FIG. 1 in accordance with the preferred embodiment of the invention.

Referring now to FIG. 2, the target display 12 is an opaque template display which is adapted to be covered over by the reticle display 13. In this manner, an instructor/coach can superimpose the transparent reticle display in overlying relationship to the target template display to simulate visual alignment of the firearm on a target in order to show a trainee/shooter how to correctly aim a firearm at a target at 300 meters.

Additionally, as indicated in FIG. 2, the trainee/shooter can alternatively reposition the two template displays 12 & 13 relative to one another to communicate to the instructor/coach what aiming point that the trainee/shooter is using. The instructor/coach could then use this information to determine if the trainee/shooter is using the correct aiming point given the conditions. In this regard, the aiming point could be positionally adjusted for not only range, but for other conditions such as, but not limited to, crosswinds.

As shown in FIG. 2, the crotch 38 of the chevron 32 is positioned relative to the target image 18. This provides or is the indication of where to properly aim the firearm being used at a range of 200 meters.

Figure 3:
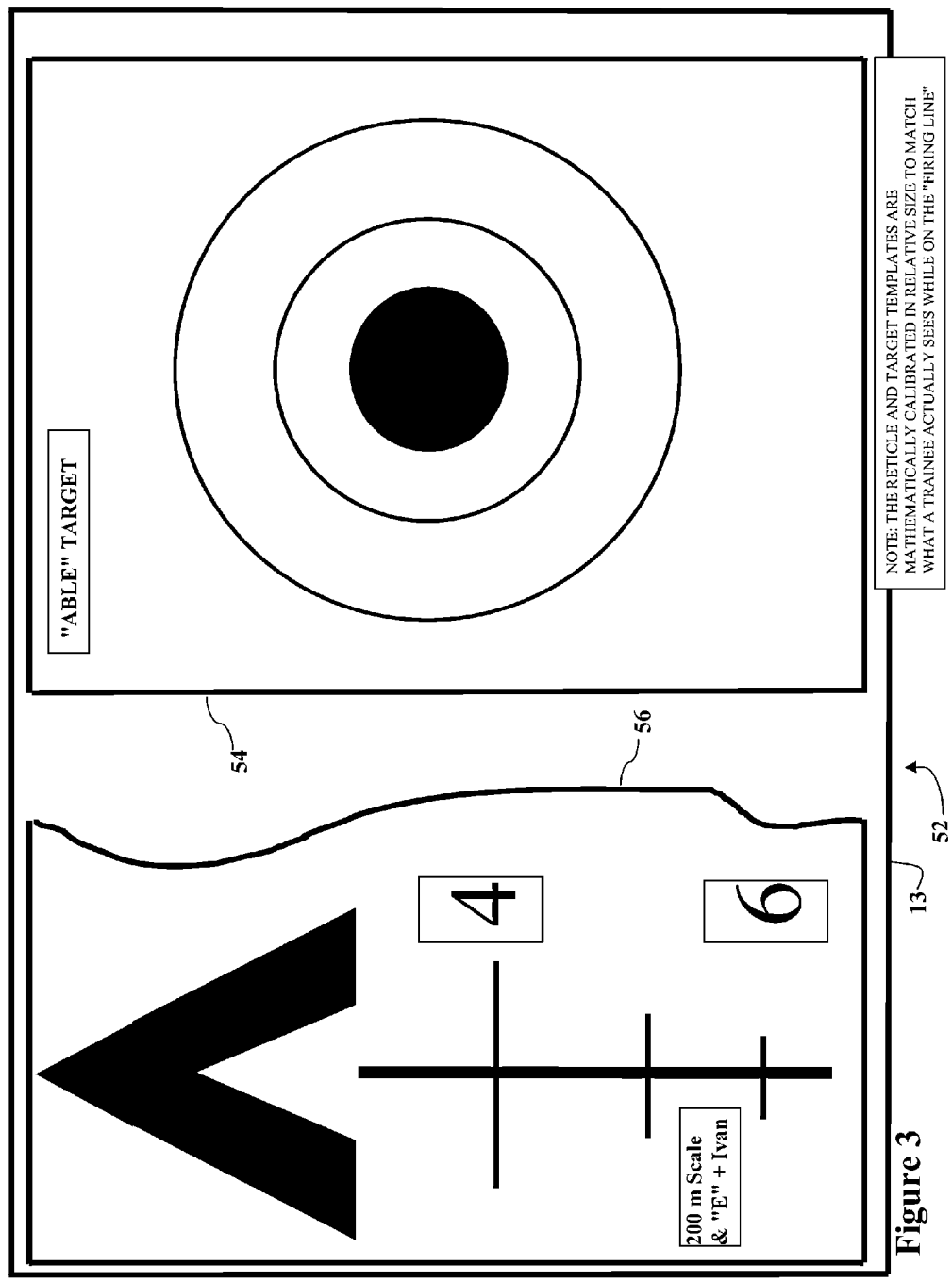
FIG. 3 is a partially broken away face view of a firearm sight training tool constructed in accordance with another embodiment of the present invention.

As shown in FIG. 3, there is disclosed a firearm sight training tool 52 having a target display 54 and a reticle display 56, which is constructed according to another embodiment of the present invention. The sight training tool 52 is similar to the sight training tool 10a & 10b except that it is of a different target pattern. The reticle and target template displays are mathematically calibrated in relative size to match what a shooter actually sees through the firearm sights while visualizing the target on the firing line.

Figure 4:
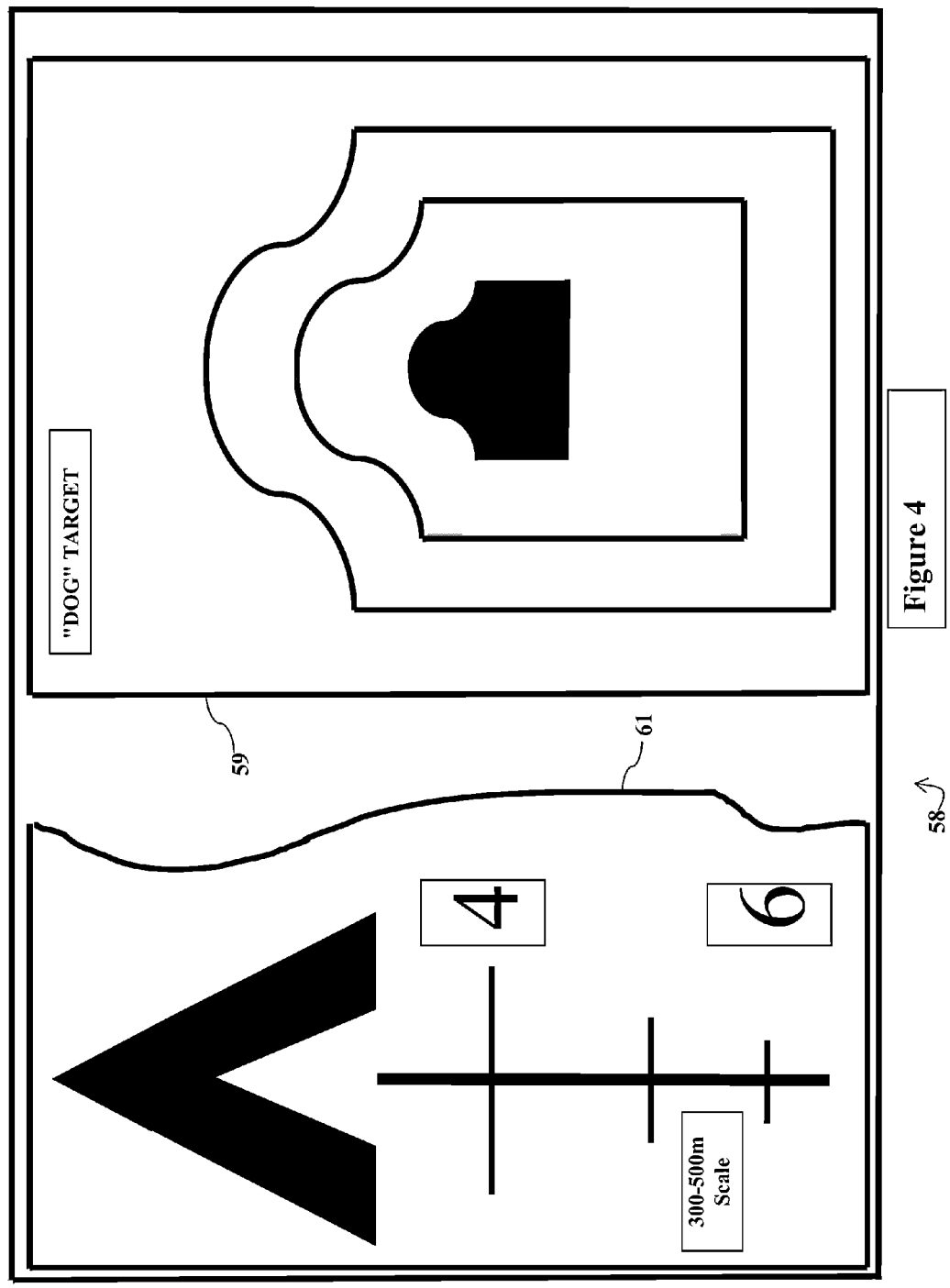
FIG. 4 is a partially broken away face view of a firearm sight training tool constructed in accordance with another embodiment of the present invention.

As shown in FIG. 4, a firearm sight training tool 58 includes a target display 59 and a reticle display 61 according to yet another embodiment of the present invention. The sight training tool 58 is also similar to the firearm sight training tool 10a & 10b except that it shows an alternative target image.

Figure 5:
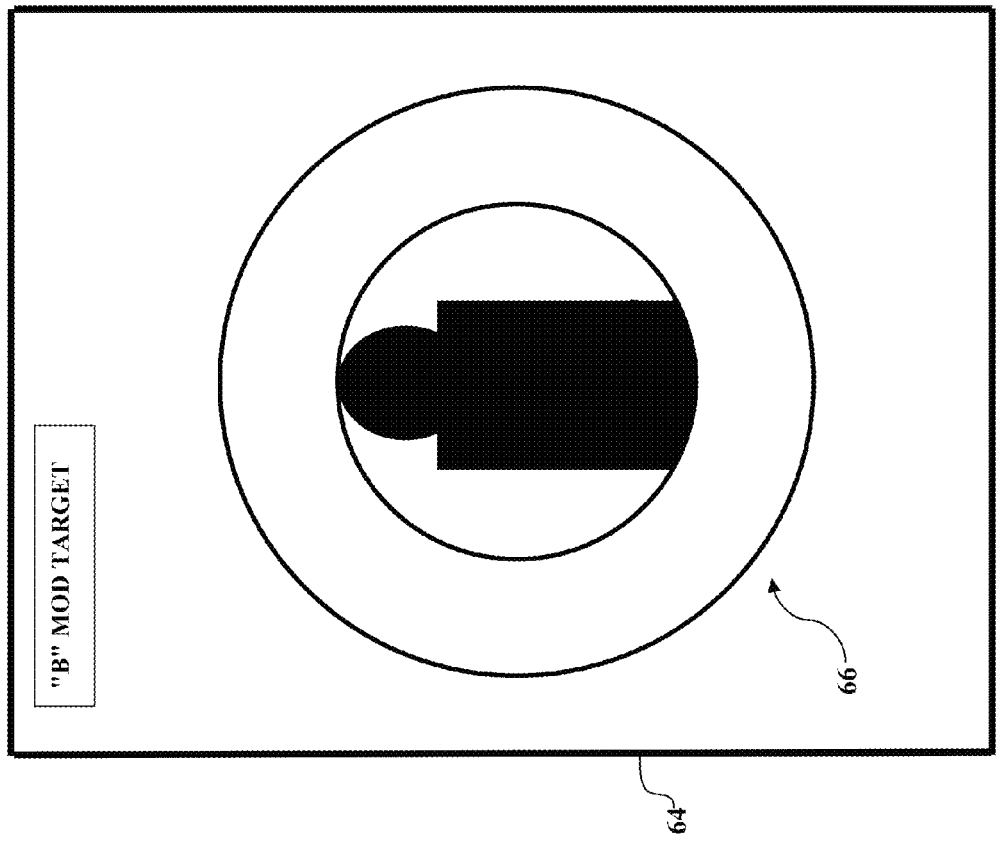
FIG. 5 is a face view of a target template of a firearm sight training tool constructed according to another embodiment of the present invention.

Referring now to FIG. 5, there is shown a firearm sight training tool 63 having a target display 64 and including a target image 66, which is constructed according to a further embodiment of the present invention, and which is another alternative of the target images. The target image 66 is useful for longer range targets. The sight training tool 63 may include a reticle display similar to the reticle display 13.

Finally, it will be apparent to those skilled in the art of firearm instruction or training, and/or other related fields that many other modifications and/or substitutions can be made to the foregoing preferred embodiments without departing from the spirit and scope of the present invention. The preferred embodiments and the best mode of the present invention are described herein. However, it should be understood that the best mode for carrying out the invention herein described is by way of illustration and not by way of limitation. Therefore, it is intended that the scope of the present invention includes all of the modifications that incorporate its principal design features, and that the scope and limitations of the present invention should be determined by the scope of the appended claims and their equivalents.

What is claimed is:

1. A method of facilitating the training of a firearm user learning to align a firearm's sights relative to a target using at least two physical sheet templates including a reticle display template and a target display template, the method comprising:
   Manually overlaying the target display template with the reticle display template; and
   Manually positioning the target display template and the reticle display template relative to each such display to indicate to the firearm user how to properly align the firearm's sights relative to an actual target.

2. The method of claim 1, wherein said target display template comprises at least one target image, and wherein said reticle display template comprises at least one reticle image.

3. The method of claim 2, wherein said at least one target image is dimensioned to correspond to the actual size of said actual target as viewed by the firearm user at a given distance.

4. The method of claim 3, wherein each of said at least one reticle image is dimensioned in proportion to the size of one of said at least one target image to correspond to the actual size of said actual target as viewed by the firearm user at a given distance.

5. A tool for facilitating the training of a firearm user learning to align the sights of a firearm display relative to an actual target, comprising:
   a physical sheet template displaying an image of a target;
   a physical sheet template displaying an image of a reticle;
   wherein said physical sheet template displaying an image of a reticle is manually disposed in an overlying relationship with respect to the physical sheet template displaying an image of a target, and wherein the positioning of said overlying relationship is designed to provide information to the firearm user regarding the proper alignment of the sights of said firearm relative to said actual target.

6. The tool of claim 5, wherein said physical sheet template displaying an image of a target comprises at least one target image, and wherein said physical sheet template displaying an image of a reticle comprises at least one reticle image.

7. The tool of claim 6, wherein said at least one target image is dimensioned to correspond to the actual size of said actual target as viewed by the firearm user at a given distance.

8. The tool of claim 5, wherein said physical sheet template displaying an image of a reticle further comprises markings to facilitate instructional communications between said firearm user and a training instructor.

9. The tool of claim 8, wherein said tool is configured for long range instructional purposes.

10. The tool of claim 8, wherein said tool is configured for iron sight instructional purposes.

11. The tool of claim 8, wherein said tool is configured for optical sight instructional purposes.

12. The tool of claim 5, wherein said physical sheet template displaying an image of a target is opaque, and said physical sheet template displaying an image of a reticle is a transparency that further comprises opaque markings, and wherein the overlying relationship between the physical sheet template displaying an image of a target and the physical sheet template displaying an image of a reticle facilitates instructional communications between said firearm user and a training instructor.

13. A tool for facilitating the training of a firearm user learning to align the sights of a firearm relative to an actual target, comprising:
   A physical sheet template displaying at least one target image of a certain size corresponding to the actual size of said actual target as viewed by the firearm user at a given distance;
   A physical sheet template displaying at least one reticle image sized in proportion to said certain size of said at least one target image for the given distance; and
   wherein said at least one target image and said at least one reticle image are capable of being manually positioned in overlying relationship in order to indicate to the firearm user how to properly align the sights of said firearm relative to said actual target.

\* \* \* \* \*